(12) United States Patent
Wright et al.

(10) Patent No.: US 11,332,079 B2
(45) Date of Patent: May 17, 2022

(54) OVERMOLDED TRIM COMPONENT WITH INTEGRATED SENSOR LENS ASSEMBLY

(71) Applicant: GM GLOBAL TECHNOLOGY OPERATIONS LLC, Detroit, MI (US)

(72) Inventors: Adam L. Wright, Livonia, MI (US); Nathaniel W. Hart, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 16/793,497

(22) Filed: Feb. 18, 2020

(65) Prior Publication Data

US 2021/0253041 A1    Aug. 19, 2021

(51) Int. Cl.
| | |
|---|---|
| *B29D 11/00* | (2006.01) |
| *B60R 11/00* | (2006.01) |
| *B60R 13/02* | (2006.01) |
| *B60S 1/02* | (2006.01) |
| *G01S 7/481* | (2006.01) |
| *G02B 1/11* | (2015.01) |
| *G02B 1/14* | (2015.01) |
| *G02B 27/00* | (2006.01) |

(52) U.S. Cl.
CPC ........ *B60R 13/02* (2013.01); *B29D 11/00423* (2013.01); *B29D 11/00865* (2013.01); *B60R 11/00* (2013.01); *B60S 1/023* (2013.01); *G01S 7/4811* (2013.01); *G02B 1/11* (2013.01); *G02B 1/14* (2015.01); *G02B 27/0006* (2013.01); *B60R 2011/004* (2013.01); *B60R 2013/0287* (2013.01)

(58) Field of Classification Search
CPC ........ B29D 11/00403; B29D 11/00423; B60R 2011/004; B60R 2011/0043; B60R 13/02; B60R 2013/0287; B60R 19/483; B60R 2300/301; G01S 7/4811; G01S 7/4812; G01S 7/4813; G01S 2013/9327–93277; G01S 17/931; G02B 7/02; G02B 7/021; G02B 7/025; G02B 19/009; G02B 27/0006
See application file for complete search history.

(56) References Cited

U.S. PATENT DOCUMENTS

| | | | |
|---|---|---|---|
| 2009/0010494 A1* | 1/2009 | Bechtel | B60R 1/00 382/104 |
| 2017/0158111 A1* | 6/2017 | Zawacki | B60Q 1/28 |
| 2019/0158765 A1* | 5/2019 | Kuybeda | H04N 5/22521 |

* cited by examiner

*Primary Examiner* — Ryan S Dunning
(74) *Attorney, Agent, or Firm* — Quinn IP Law

(57) ABSTRACT

A vehicle trim assembly includes a trim component having an interior facing surface and an exterior facing surface opposite the interior facing surface, a lens assembly overmolded into the trim component, the lens assembly including an optical surface positioned adjacent to the exterior facing surface of the trim component, and a sensor module including a sensor housing enclosing a sensor, the sensor module joined to the trim component and the lens assembly.

20 Claims, 2 Drawing Sheets

OVERMOLDED TRIM COMPONENT WITH INTEGRATED SENSOR LENS ASSEMBLY

INTRODUCTION

The present disclosure relates generally to a sensor lens assembly integrated into a component, such as a plastic vehicle trim component.

The placement of sensor lens assemblies for vehicle sensors, such as LiDAR sensors, behind plastic trim components causes a reduction in range and optical quality of the sensor. The use of optical-grade plastic that allows improved optical quality and range for sensors mounted behind the component increases the manufacturing cost of the component.

SUMMARY

Embodiments according to the present disclosure provide a number of advantages. For example, embodiments according to the present disclosure enable the use of smaller quantities of expensive, optical grade plastics while increasing the effective range and optical quality of the sensor.

In one aspect of the present disclosure a vehicle trim assembly includes a trim component having an interior facing surface and an exterior facing surface opposite the interior facing surface, a lens assembly overmolded into the trim component, the lens assembly including an optical surface positioned adjacent to the exterior facing surface of the trim component and a sensor module including a sensor housing enclosing a sensor, the sensor module joined to the trim component and the lens assembly.

In some aspects, the sensor module is joined to the lens assembly using an optical clear adhesive.

In some aspects, the vehicle trim assembly further includes a mounting element formed with the trim component and the sensor module is coupled to the mounting element.

In some aspects, the lens assembly includes a lens molded within the trim component using a multi-shot injection molding process.

In some aspects, the lens assembly includes a plurality of injection molded lenses formed in a multi-shot injection molding process with the trim component.

In some aspects, the optical surface of the lens assembly includes an intermediate layer comprising an antireflective coating.

In some aspects, the exterior facing surface of the trim component includes a hard coat comprising an optical grade infrared transmissive layer.

In some aspects, the lens assembly includes a heat element configured to defog the lens assembly.

In some aspects, the trim component includes a heat conductive material configured to cool the lens assembly.

In some aspects, the vehicle trim assembly further includes a heat sink thermally coupled to the sensor module.

In another aspect of the present disclosure, a method for manufacturing a trim integrated lens assembly for a vehicle sensor includes determining a specification for each lens of the lens assembly, manufacturing each lens of the lens assembly with a multi-shot injection molding process, the lens assembly including an optical surface, molding, in an injection molding overmold process, a trim component around each lens of the lens assembly, applying an antireflective coating to the optical surface of the lens assembly, and applying an infrared transmissive hard coating to the lens assembly exterior of the antireflective coating.

In some aspects, the method further includes providing a sensor module having a housing enclosing the vehicle sensor and applying an optical clear adhesive to adhesively join the sensor module to the lens assembly.

In another aspect of the present disclosure, an automotive vehicle includes a vehicle body including a trim integrated lens assembly, the trim integrated lens assembly including a trim component having an interior facing surface including a mounting element and an exterior facing surface, a lens assembly including a lens overmolded with the trim component, and a sensor module including a sensor housing enclosing a sensor and joined to the mounting element of the trim component and aligned with the lens assembly such that an optical transmission from the sensor passes through the lens assembly.

In some aspects, the sensor housing is coupled to the trim component and the lens assembly with an optical grade adhesive.

In some aspects, the lens assembly includes a plurality of injection molded lenses formed in a multi-shot injection molding process with the trim component.

In some aspects, the lens of the lens assembly includes an intermediate layer comprising an antireflective coating.

In some aspects, the exterior facing surface of the trim component includes a hard coat comprising an optical grade infrared transmissive layer.

In some aspects, the lens assembly includes a heat element configured to defog the lens assembly.

In some aspects, the trim component includes a heat conductive material configured to cool the lens assembly.

In some aspects, the automotive vehicle further includes a heat sink thermally coupled to the sensor module.

BRIEF DESCRIPTION OF THE DRAWINGS

The present disclosure will be described in conjunction with the following figures, wherein like numerals denote like elements.

Figure 1:
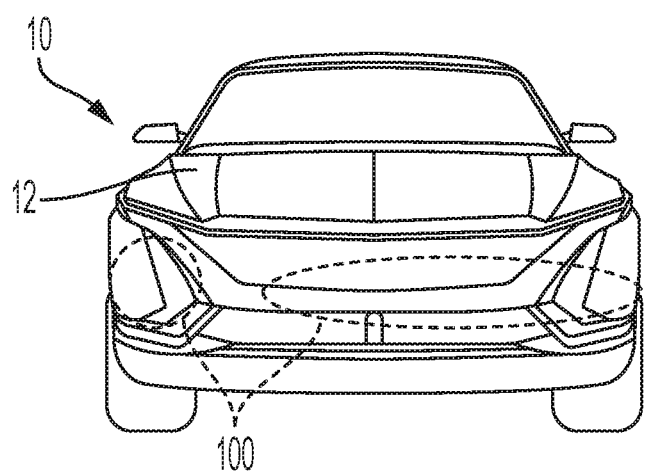
FIG. 1 is a schematic front view of a vehicle including a trim integrated lens assembly for a vehicle sensor, according to an embodiment of the disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Typically, a vehicle sensor, such as a LiDAR sensor, is mounted behind a vehicle trim piece with expensive optical-grade plastic and glass used to cover the lens portion of the sensor. In other embodiments, the sensor is mounted such that the lens opens through a hole in the vehicle trim piece. Both of these approaches increase the cost and manufacturing complexity of the trim component and also sacrifice the range and optical quality of the sensor.

FIG. 1 schematically illustrates a vehicle 10. The vehicle 10 includes a body 12. The body 12 includes a plurality of body structures and components that form an exterior surface of the vehicle 10. In various embodiments, the body 12 includes one or more vehicle trim assemblies 100, such as lighting trim assemblies and grill trim assemblies, for example and without limitation. The vehicle trim assembly 100 includes, in various embodiments, a lens assembly integrally formed with the trim assembly to reduce the use of expensive, optical grade materials and improve optical quality of the integrated sensor lens assembly.

Figure 2:
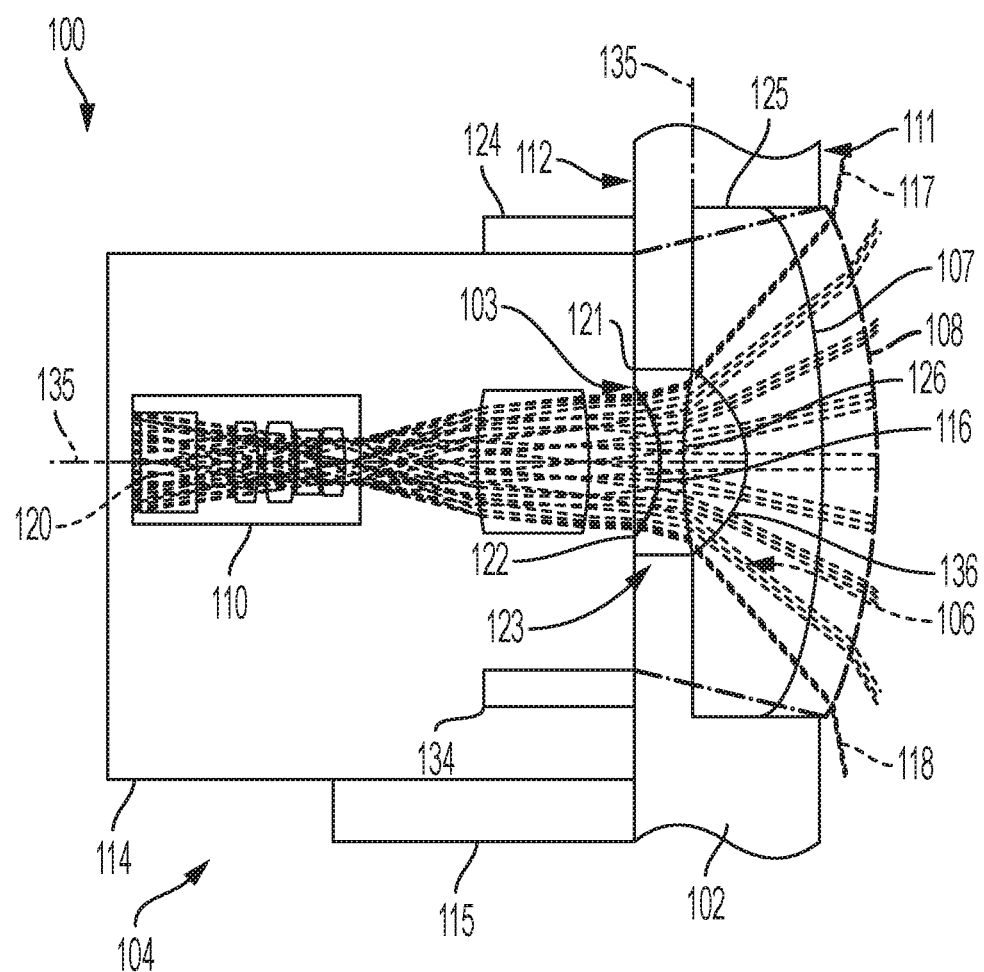
FIG. 2 is a schematic overhead cut-away view of a trim component with a trim integrated lens assembly for a vehicle sensor, according to an embodiment of the disclosure.

As shown in FIG. 2, the vehicle trim assembly 100 integrates a lens assembly for an optical sensor, such as a LiDAR sensor, into an injection molded trim component. A multi-shot mold process is used to tightly control and locate the lens assembly region such that smaller quantities of optical grade plastics are used in the trim assembly 100. Additionally, the overall size of the LiDAR module is reduced with this assembly. Furthermore, the method of manufacture discussed herein is scalable to other vehicle components incorporating LiDAR sensors or other optical sensors, such as vehicle bumpers, rear trim components, lighting assemblies, etc. Integration of the sensor lens assembly into the trim component further allows for discrete sensor mounting in many locations around the vehicle.

The vehicle trim assembly 100 includes a trim component 102, a sensor module 104, and a lens assembly 106. The sensor module 104 includes a housing 114 that encloses a sensor 110. In various embodiments, the sensor 110 is an optical sensor, such as a LiDAR sensor. In various embodiments, a heat sink 115 is thermally coupled to the housing 114 of the sensor module 104.

The trim component 102 includes an exterior facing surface, or A-surface, 111 and an interior facing surface, or B-surface, 112. In various embodiments, the trim component 102 is an overmolded thermal conductive material configured to act as a heat sink for the sensor module 104 and the lens assembly 106. In various embodiments, one or more mounting or locating elements 124, 134 are included in the overmolded trim component 102 to provide mounting and locating surfaces for the sensor module 104. In various embodiments, an adhesive 103 couples the housing 114 of the sensor module 104 to the lens assembly 106. In various embodiments, the adhesive 103 is an optical clear adhesive (OCA). In various embodiments, the housing 114 is coupled to the lens assembly 106 via a mechanical snap and/or positioning pins. In various embodiments, the housing 114 is coupled to the lens assembly 106 via an adjustable mount to enable precise alignment of the housing 114 with the lens assembly 106 during manufacture and calibration.

The trim component 102 includes first edge 121 and a second edge 122 defining an opening 123 in the trim component 102. The lens assembly 106 is formed with the trim component 102 in a multi-shot injection molding process such that the lens assembly 106 extends through the opening 123 in the trim component 102. In various embodiments, the lens assembly 106 includes a plurality of lens to refine and focus an optical transmission 120 from the sensor 110. In the illustrated embodiment, the lens assembly 106 includes a first lens 116, a second lens 126, and a third lens 136. The lenses 116, 126, 136 are oriented such that the optical transmission 120 passes from the sensor 110 through the opening 123 and through the lens assembly 106. In various embodiments, the lens assembly 106 changes a field of view of the sensor 110 to achieve vehicle-specific architecture requirements, such as the expected field of view depending on the sensor mounting location, etc., for example and without limitation. In various embodiments, the position of the lens assembly 106 within the trim component 102 enables a wider field of view of the sensor 110, as shown by the field of view limits 117, 118.

The lens assembly 106 comprising the plurality of lens 116, 126, 136 is formed in a multi-shot injection molding process to integrate the lens assembly 106 with the trim component 102. The lens assembly 106 extends between the B-surface 112 and the A-surface 111, and, in various embodiments, each lens 116, 126, 136 of the lens assembly 106 is formed as a step in a multi-shot injection molding process that includes manufacture of the trim component 102. In various embodiments, each of the plurality of lenses of the lens assembly 106 is between the B-surface 112 and the A-surface 111 of the trim component 102. In various embodiments, one or more heating elements, such as a heat element 125 is incorporated into the lens assembly 106. The heat element 125 defogs and/or defrosts the lenses of the lens assembly 106.

In various embodiments, an intermediate layer 107 is incorporated into the lens assembly 106 between the outermost lens 136 and an exterior hard coat 108. The intermediate layer 107 is, in various embodiments, an antireflective coating optimized for use with LiDAR sensors, such as the sensor 110. In various embodiments, optical antireflective coatings reduce the reflectivity of the windshield thereby reducing veiling glare. The hard coat 108 is incorporated into the external layer of the lens assembly 106. In various embodiments, the hard coat 108 is an optical grade infrared transmissive layer. The integration of the lens assembly 106 within the trim component 102 reduces the amount of the hard coat 108 needed to cover and protect the lenses of the lens assembly 106.

Cabling and connection elements, such as connection members 135, are coupled to the sensor module 104 and/or the heat elements 125 to provide power to the components and/or communication capability. In various embodiments, the connection members 135 connect the components to at least one controller of the vehicle via a wireless or wired connection.

Figure 3:
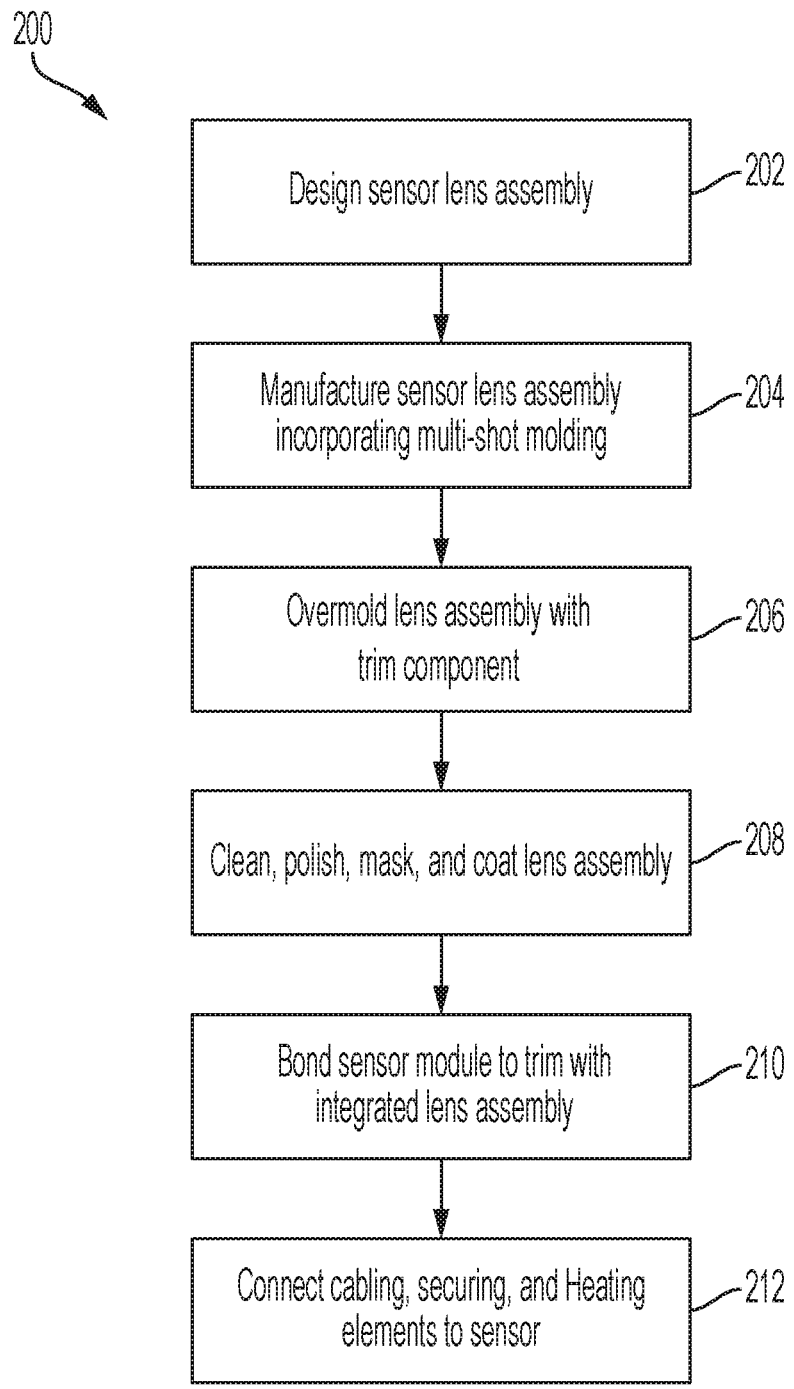
FIG. 3 is a flow diagram of a method for manufacturing a component with an integrated sensor lens assembly, according to an embodiment of the disclosure.

FIG. 3 illustrates a method 200 to manufacture a trim integrated lens assembly for a vehicle sensor. The method 200 can be utilized in connection with the vehicle trim assembly 100 discussed herein. The order of operation of the method 200 is not limited to the sequential execution as illustrated in FIG. 3, but may be performed in one or more varying orders, or steps may be performed simultaneously, as applicable in accordance with the present disclosure.

Beginning at 202, a sensor lens assembly is designed to satisfy a vehicle program specific use. The sensor lens assembly 106 is combined with a common sensor module 104, such as a LiDAR module, such that an application-specific sensor lens assembly 106 is interchangeable with the common sensor module 104.

Next, at 204, the sensor lens assembly 106 is manufactured from high quality optical grade plastics such that the sensor lens assembly 106 is able to transmit an optical transmission from the sensor module 104. In various embodiments, the sensor lens assembly 106 is manufactured using multi-shot molding techniques known to those skilled in the art. Robotic assistance may also be used to exactly place glass elements of the sensor lens assembly 106.

The method continues with 206, as the trim component 102 is overmolded around the sensor lens assembly 106. The trim component 102 is manufactured from less expensive materials and, in various embodiments, also includes heat conductive materials to act as a heat sink for the sensor lens assembly 106 and the sensor module 104. Mounting and locating elements, such as the mounting or locating elements 124, 134, are also molded into the trim component 102.

Next, at 208, an exterior surface of the sensor lens assembly 106 is cleaned and polished. In various embodiments, a masking material and coating material, such as the antireflective coating or intermediate layer 107 and the hard coat 108 are applied to the sensor lens assembly 106 to protect the lens surface and permit clear transmission and receipt of optical waves.

At 210, an optical clear adhesive, such as the adhesive 103 is applied to bond the housing 114 of the sensor module 104 to the lens assembly 106 and the trim component 102.

Finally, at 212, cabling and other electrical connection elements, such as the connection members 135 are secured to the sensor module 104 and/or the heating elements, such as the heat element 125.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can" "could," "might," "may," "e.g.," and the unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle trim assembly, comprising:
   a trim component having an interior facing surface and an exterior facing surface opposite the interior facing surface;
   a lens assembly including one or more lenses and having an optical surface positioned adjacent to the exterior facing surface of the trim component, wherein the trim component is overmolded surrounding at least one lens of the lens assembly; and
   a sensor module including a sensor housing enclosing a sensor, wherein the sensor module is joined to at least one of the trim component and the lens assembly.

2. The vehicle trim assembly of claim 1, wherein the trim component includes an opening therethrough, and wherein at least a portion of the lens assembly is disposed within and fills the opening.

3. The vehicle trim assembly of claim 1 further comprising a mounting element formed with the trim component and the sensor module is coupled to the mounting element.

4. The vehicle trim assembly of claim 1, wherein the lens assembly includes a lens molded within the trim component using a multi-shot injection molding process.

5. The vehicle trim assembly of claim 1, wherein the lens assembly includes a plurality of injection molded lenses formed in a multi-shot injection molding process with the trim component.

6. The vehicle trim assembly of claim 1, wherein the optical surface of the lens assembly includes an intermediate layer comprising an antireflective coating.

7. The vehicle trim assembly of claim 1, wherein the exterior facing surface of the trim component includes a hard coat comprising an optical grade infrared transmissive layer.

8. The vehicle trim assembly of claim 1, wherein the lens assembly includes a heat element configured to defog the lens assembly.

9. The vehicle trim assembly of claim 1, wherein the trim component includes a heat conductive material configured to cool the lens assembly.

10. The vehicle trim assembly of claim 1 further comprising a heat sink thermally coupled to the sensor module.

11. A method for manufacturing a trim integrated lens assembly for a vehicle sensor, comprising:
    determining a specification for each lens of the lens assembly;
    manufacturing each lens of the lens assembly with a multi-shot injection molding process, the lens assembly including an optical surface;
    molding, in an injection molding overmold process, a trim component around each lens of the lens assembly;
    applying an antireflective coating to the optical surface of the lens assembly; and
    applying an infrared transmissive hard coating to the lens assembly exterior of the antireflective coating.

12. The method of claim 11 further comprising providing a sensor module having a housing enclosing the vehicle sensor and applying an optical clear adhesive to adhesively join the sensor module to the lens assembly.

13. An automotive vehicle comprising a vehicle body including a trim integrated lens assembly, the trim integrated lens assembly including a trim component having an interior facing surface including a mounting element and an exterior facing surface, a lens assembly including at least one lens wherein the trim component is overmolded surrounding at least one lens of the lens assembly, and a sensor module including a sensor housing enclosing a sensor and joined to the mounting element of the trim component and aligned with the lens assembly such that an optical transmission from the sensor passes through the lens assembly.

14. The automotive vehicle of claim 13 wherein the sensor housing is coupled to at least one of the trim component and the lens assembly with an optical grade adhesive.

15. The automotive vehicle of claim 13, wherein the lens assembly includes a plurality of injection molded lenses formed in a multi-shot injection molding process with the trim component.

16. The automotive vehicle of claim 13, wherein the lens of the lens assembly includes an intermediate layer comprising an antireflective coating.

17. The automotive vehicle of claim 13, wherein the exterior facing surface of the trim component includes a hard coat comprising an optical grade infrared transmissive layer.

18. The automotive vehicle of claim 13, wherein the lens assembly includes a heat element configured to defog the lens assembly.

19. The automotive vehicle of claim 13, wherein the trim component includes a heat conductive material configured to cool the lens assembly.

20. The automotive vehicle of claim 13 further comprising a heat sink thermally coupled to the sensor module.

* * * * *